(12) United States Patent
Tsumekawa et al.

(10) Patent No.: US 9,838,559 B2
(45) Date of Patent: Dec. 5, 2017

(54) ILLUMINATION APPARATUS, IMAGE SENSOR UNIT AND IMAGE READING APPARATUS

(71) Applicant: CANON COMPONENTS, INC., Saitama (JP)

(72) Inventors: Yoshihiko Tsumekawa, Saitama (JP); Hidemasa Yoshida, Saitama (JP)

(73) Assignee: CANON COMPONENTS, INC., Saitama (JP)

( * ) Notice: Subject to any disclaimer, the term of this patent is extended or adjusted under 35 U.S.C. 154(b) by 0 days.

(21) Appl. No.: 15/230,813

(22) Filed: Aug. 8, 2016

(65) Prior Publication Data
US 2017/0064125 A1 Mar. 2, 2017

(30) Foreign Application Priority Data
Aug. 28, 2015 (JP) .................................. 2015-169748

(51) Int. Cl.
*H04N 1/04* (2006.01)
*H04N 1/028* (2006.01)

(52) U.S. Cl.
CPC ......... *H04N 1/0286* (2013.01); *H04N 1/0289* (2013.01); *H04N 1/02855* (2013.01)

(58) Field of Classification Search
CPC ............. H04N 1/0289; H04N 1/02418; H04N 1/02835; H04N 2201/0081; H04N 2201/0094; H04N 2201/02456; H04N 2201/02462; H04N 2201/02493; H04N 2201/02497; H04N 1/02855; H04N 1/0286; G01J 1/0407

USPC ............. 358/474, 475, 509, 482; 250/208.1; 349/65, 58; 362/551, 613; 600/109, 110, 600/133, 169
See application file for complete search history.

(56) References Cited

U.S. PATENT DOCUMENTS

| | | | | |
|---|---|---|---|---|
| 8,888,308 B2* | 11/2014 | Takata | ............. | G02F 1/133308 362/217.13 |
| 9,158,062 B2* | 10/2015 | Yoshida | ............... | G02B 6/0096 |
| 2009/0034024 A1* | 2/2009 | Kim | .................... | H04N 1/02815 358/475 |
| 2009/0034030 A1* | 2/2009 | Nagatani | ............ | H04N 1/02815 358/509 |
| 2009/0034297 A1* | 2/2009 | Tahk | ................... | H04N 1/02815 362/634 |

(Continued)

FOREIGN PATENT DOCUMENTS

JP 2014033440 A 2/2014

*Primary Examiner* — Negussie Worku
(74) *Attorney, Agent, or Firm* — Rossi, Kimms & McDowell LLP

(57) ABSTRACT

An illumination apparatus includes: a light source; a rod-like light guide having an incident surface that enters light from the light source that is disposed on one side in a main-scan direction, a diffusing surface that diffuses light that enters from the incident surface, and an emission surface that linearly emits light towards a bill; and a reflection member having a reflection surface that reflects light diffused by the diffusing surface to the light guide. The light guide has a locking projection that is locked in the reflection member on one side in the main-scan direction. The reflection member has a locking hole in which the locking projection is locked. A cut-out portion at which one part is cut out is formed in the locking hole.

16 Claims, 14 Drawing Sheets

(56) References Cited

U.S. PATENT DOCUMENTS

| | | | |
|---|---|---|---|
| 2012/0300137 A1* | 11/2012 | Kasai | G02B 6/0085 |
| | | | 348/739 |
| 2013/0057779 A1* | 3/2013 | Takata | G02F 1/133308 |
| | | | 348/790 |
| 2014/0014819 A1 | 1/2014 | Yoshida | |
| 2015/0062670 A1* | 3/2015 | Yoshida | G02B 6/0096 |
| | | | 358/482 |
| 2015/0122979 A1 | 5/2015 | Yoshida | |
| 2015/0256703 A1* | 9/2015 | Shimoda | H04N 1/02855 |
| | | | 358/484 |
| 2015/0319329 A1* | 11/2015 | Matsuzawa | H04N 1/0281 |
| | | | 358/475 |
| 2016/0014294 A1* | 1/2016 | Matsuzawa | H04N 1/00167 |
| | | | 358/475 |
| 2016/0222623 A1* | 8/2016 | Wagner | E02F 3/342 |
| 2017/0064124 A1* | 3/2017 | Yoshida | H04N 1/0286 |

* cited by examiner

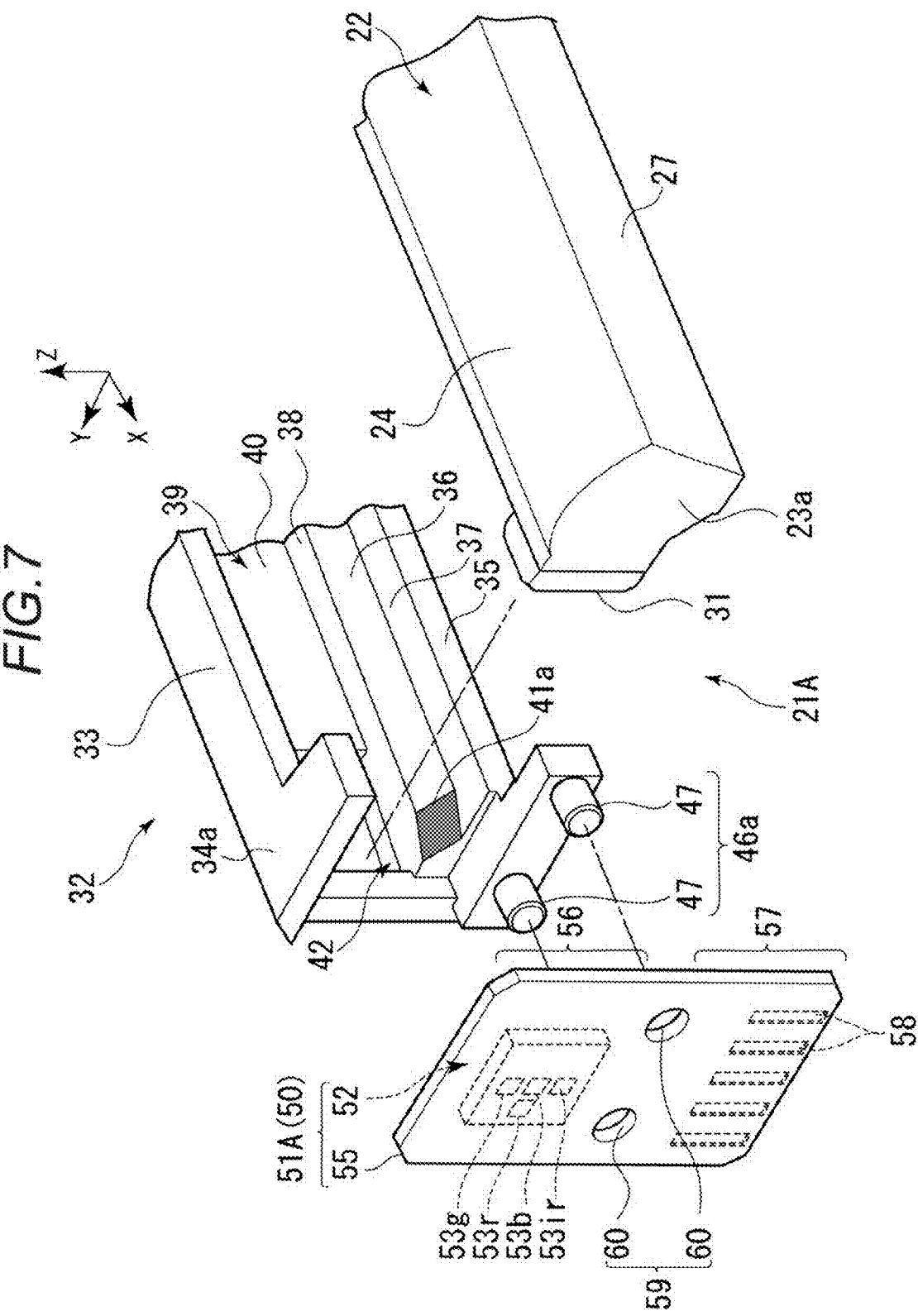

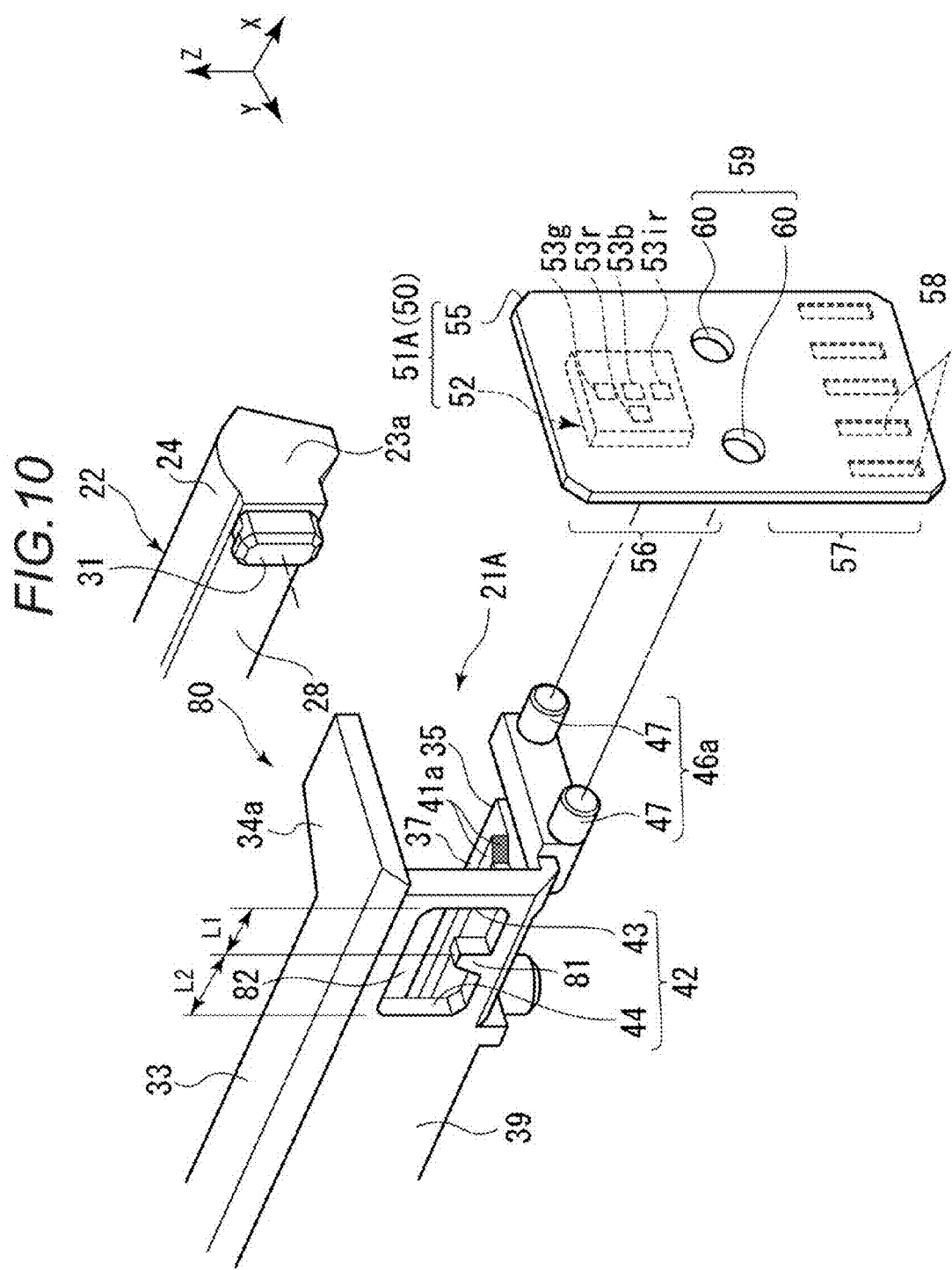

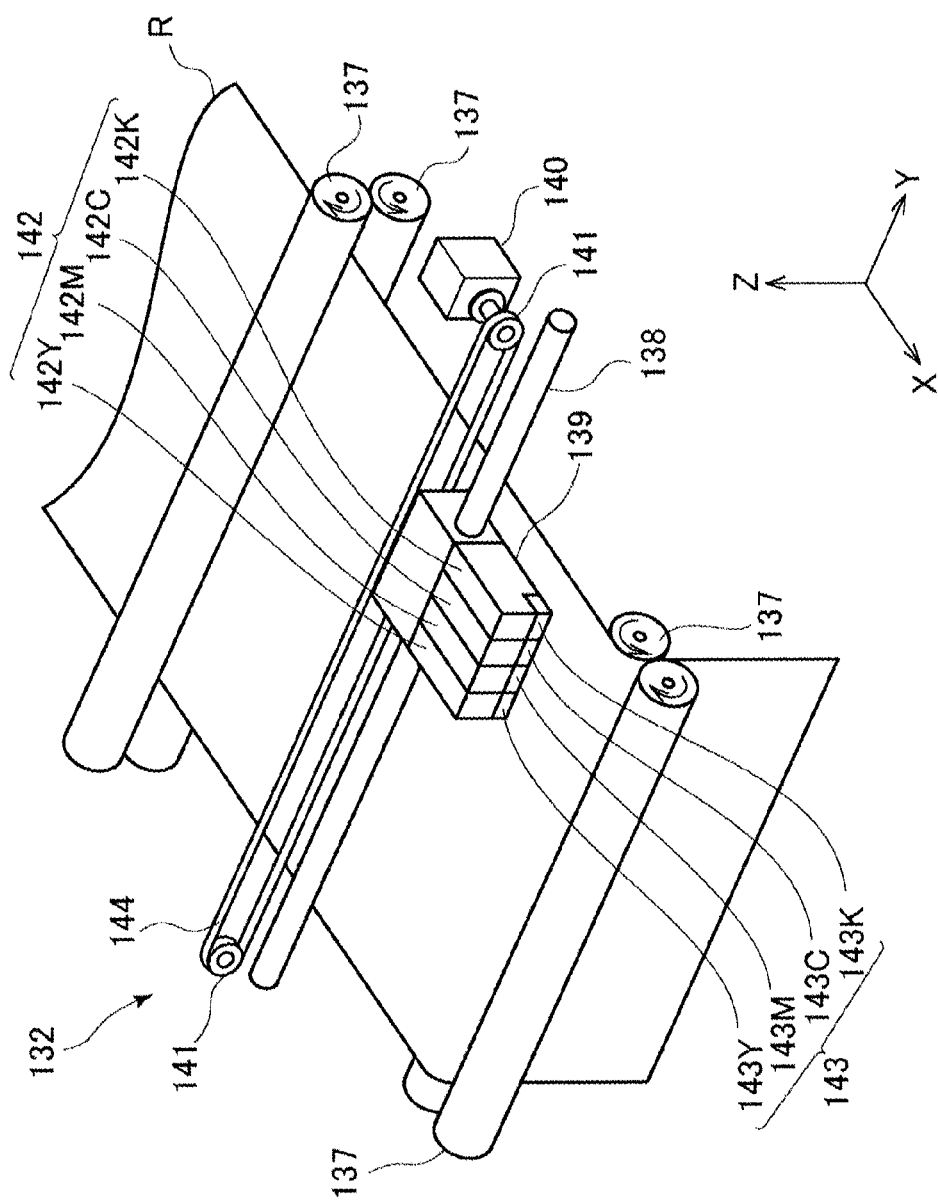

ILLUMINATION APPARATUS, IMAGE SENSOR UNIT AND IMAGE READING APPARATUS

CROSS-REFERENCE TO RELATED APPLICATIONS

This application is based upon and claims the benefit of priority of the prior Japanese Patent Application No. 2015-169748, filed on Aug. 28, 2015, the entire contents of which are incorporated herein by reference.

BACKGROUND OF THE INVENTION

[Field of the Invention]
The present invention relates to an illumination apparatus, an image sensor unit and an image reading apparatus.
[Description of the Related Art]
In general, an image sensor unit is used when reading an image of an original or the like. An image sensor unit emits linear light to an original or the like. In Patent Document 1, an image sensor unit is disclosed that emits light from a light source to an object of illumination from a light guide.

The image sensor unit of Patent Document 1 that is described above has a light guide cover that covers a light diffusing surface for the purpose of improving the utilization efficiency of light. The relative positional relationship between the light guide and the light guide cover is defined by engagement of a protrusion-like positioning portion of the light guide with an engagement portion of the light guide cover. However, since the engagement portion of the light guide cover is disposed close to the light source, a part of light that is incident on the light guide from the light source is reflected by the engagement portion and is emitted to the object of illumination. Therefore, there is a problem that the light amount emitted from the image sensor does not become uniform along the main-scan direction, and in particular the light amount on the light source side increases.
Patent Document 1: Japanese Laid-open Patent Publication No. 2014-33440

SUMMARY OF THE INVENTION

The present invention has been made in view of the problem described above, and an object of the present invention is to prevent a light amount increasing on a light source side when light is emitted linearly towards an object of illumination.

An illumination apparatus of the present invention includes: a light source; a rod-like light guide having an incident surface that enters light from the light source that is disposed on one side in a longitudinal direction, a diffusing surface that diffuses light that enters from the incident surface, and an emission surface that linearly emits light towards an object of illumination; and a reflection member having a reflection surface that reflects light that is diffused by the diffusing surface to the light guide; wherein: the light guide has a locking projection that is locked in the reflection member on the one side in the longitudinal direction; the reflection member has a locking hole in which the locking projection is locked; and a cut-out portion at which one part is cut out is formed in the locking hole.

An image sensor unit of the present invention includes: the above described illumination apparatus, an image sensor that converts light from the object of illumination to an electric signal, and a sensor substrate on which the image sensor is mounted.

An image reading apparatus of the present invention includes: the above described image sensor unit, and a transport portion that relatively transports the image sensor unit and the object of illumination.

BRIEF DESCRIPTION OF THE DRAWINGS

FIG. 7 is a perspective view illustrating the configuration of the light guide portion and the light source portion;
FIG. 10 is a sectional view illustrating essential parts of an image reading apparatus according to a second embodiment;
FIG. 14 is a perspective view illustrating an image forming portion inside the image forming apparatus.

DETAILED DESCRIPTION OF THE PREFERRED EMBODIMENTS

Hereunder, preferred embodiments of an image sensor unit, an image reading apparatus, an image forming apparatus and a paper sheet distinguishing apparatus according to the present invention will be described based on the drawings. In the following description, respective three-dimensional directions will be indicated by X, Y, and Z arrows. The X direction denotes a main-scan direction, the Y direction denotes a sub-scan direction orthogonal to the main-scan direction, and the Z direction denotes a perpendicular direction (vertical direction).

(First Embodiment)
An image reading apparatus 100 of the present embodiment functions as a paper sheet distinguishing apparatus that authenticates paper sheets, such as bills and securities.

Figure 1:
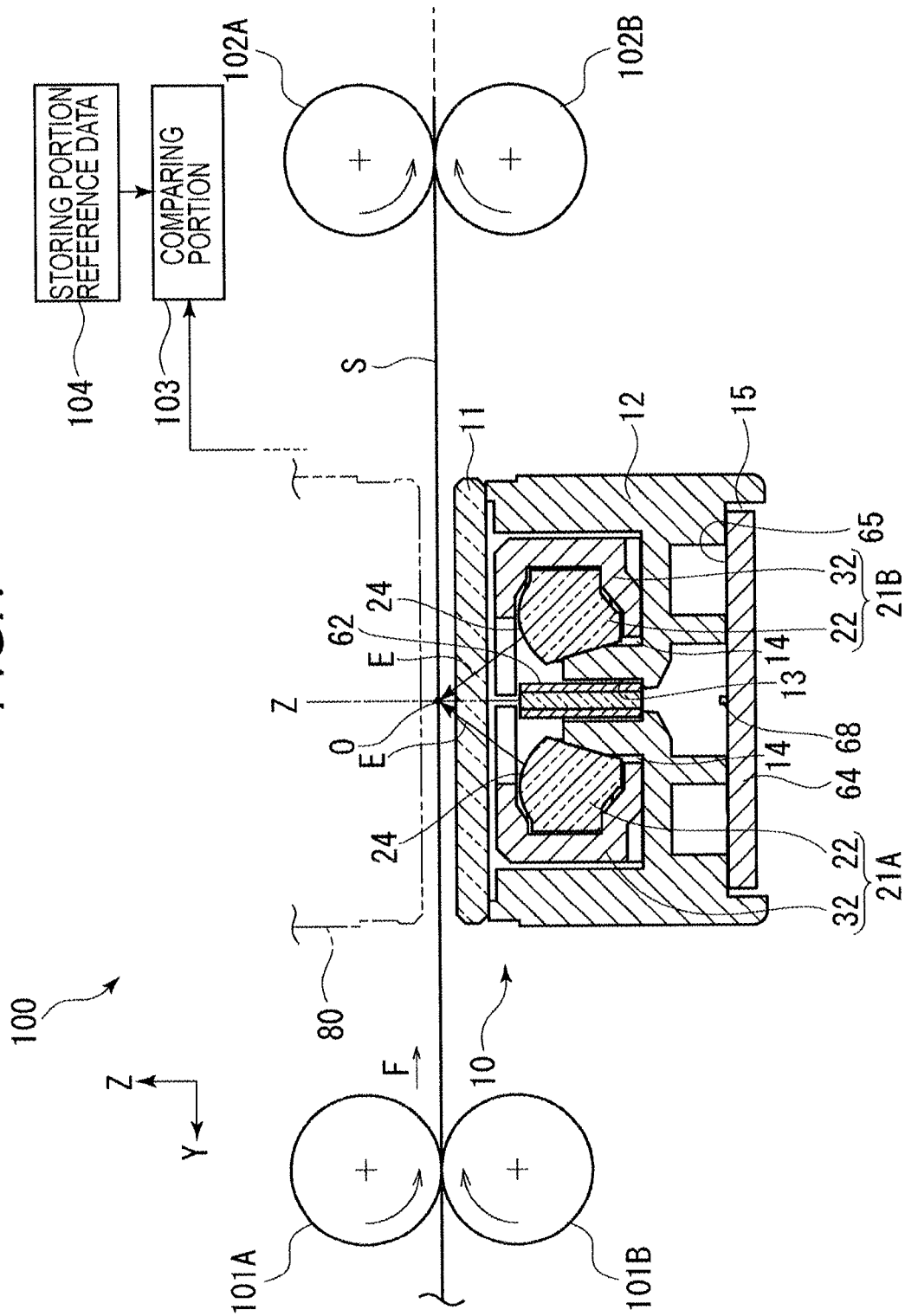
FIG. 1 is a sectional view illustrating essential parts of an image reading apparatus according to a first embodiment.

FIG. 1 is a sectional view illustrating essential parts of the image reading apparatus 100 that includes an image sensor unit 10 according to the present embodiment. First, the entire configuration will be schematically described. In the present embodiment, a bill S will be described as a typical example of an object of illumination. However, the present invention can also be applied to objects other than the bill S.

In the image reading apparatus 100, a pair of conveyor rollers 101A and 101B and a pair of conveyor rollers 102A and 102B as transport portions for conveying the bill S held therebetween are disposed at predetermined positions at a predetermined distance in a conveyance direction F of the bill S. The conveyor rollers 101A, 101B, 102A and 102B are designed to be driven to rotate by a driving mechanism to relatively transport the bill S with respect to the image sensor unit 10 at a predetermined conveyance speed in the conveyance direction F.

The image sensor unit 10 is disposed between the pair of conveyor rollers 101A and 101B and the pair of conveyor rollers 102A and 102B, and emits light toward the bill S that is transported, and reads image information of light that is reflected by the bill S.

A comparing portion 103 is connected to the image sensor unit 10. The comparing portion 103 acquires image information that is read by the image sensor unit 10. The comparing portion 103 also reads out reference data stored in a storing portion 104, and compares the reference data with the acquired image information to determine the authenticity of the bill S.

Next, the configuration of the image sensor unit 10 will be described.

Figure 2:
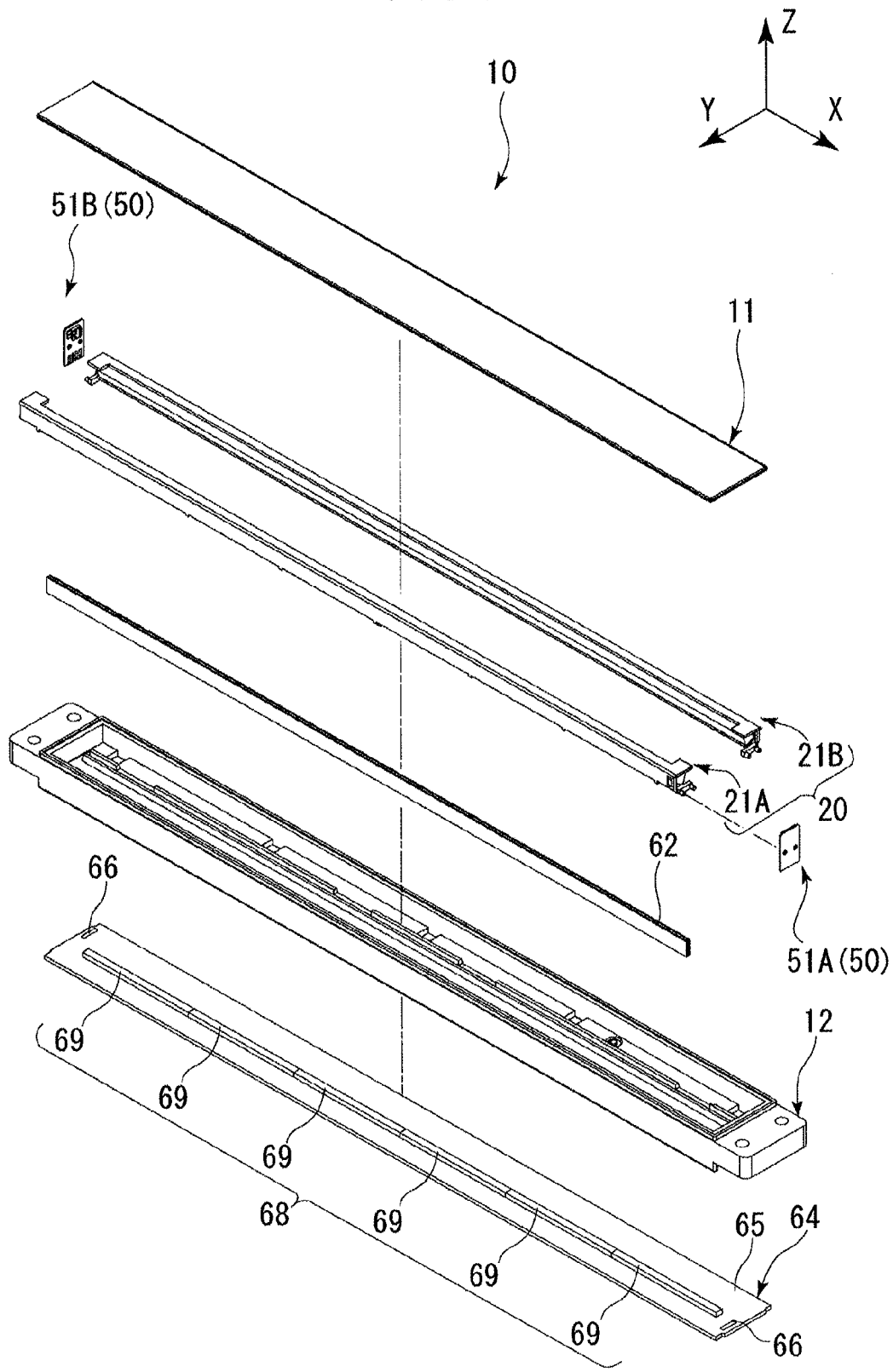
FIG. 2 is a schematic exploded perspective view of an image sensor unit.
Figure 3:
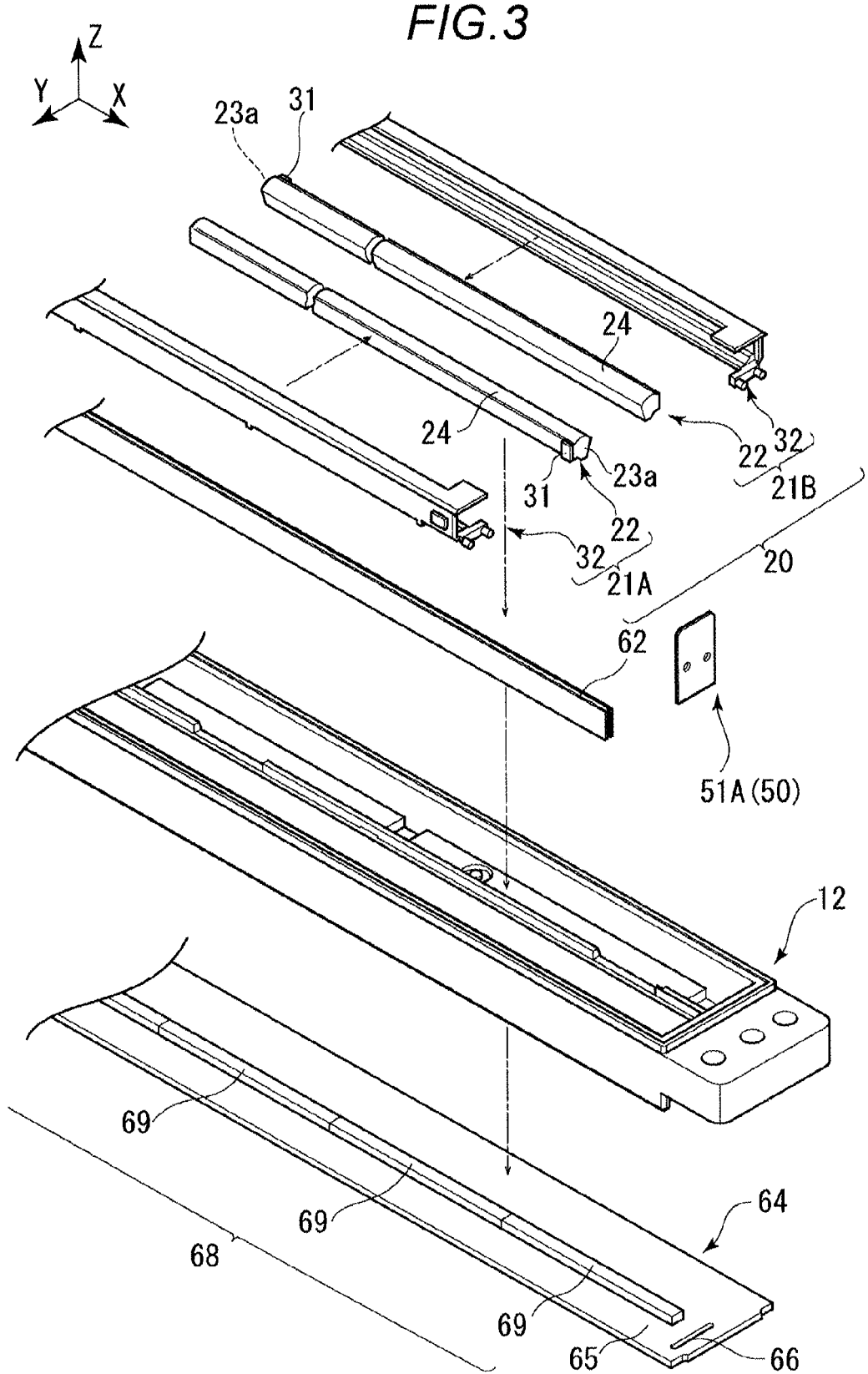
FIG. 3 is an enlarged schematic exploded perspective view of the image sensor unit.

FIG. 2 is a schematic exploded perspective view of the image sensor unit 10. FIG. 3 is a perspective view in which one side in the main-scan direction of the image sensor unit 10 shown in FIG. 2 is enlarged. The image sensor unit 10 has, generally speaking, the shape of a substantially rectangular solid, the longitudinal direction thereof being the main-scan direction, and the sub-scan direction that is perpendicular to the main-scan direction being the conveyance direction F of the bill S.

The image sensor unit 10 includes a cover member 11, a frame 12, a light guide unit 20, a light condenser 62, a sensor substrate 64, an image sensor and a light source unit 50 and the like. Among these constituent members, the light guide unit 20 and the light source unit 50 function as an illumination apparatus. Further, among the aforementioned constituent members, the cover member 11, the frame 12, the light guide unit 20, the sensor substrate 64 and the image sensor 68 have lengths in accordance with a dimension in the main-scan direction of the bill S to be read.

The cover member 11 prevents dust from entering the frame 12. The cover member 11 has a substantially plate shape that takes the main-scan direction as a longitudinal direction and, for example, a double-sided tape is used to fix the cover member 11 so as to cover the frame 12 from the upper side. Note that a transparent resin material such as glass, acryl or polycarbonate can be applied for the cover member 11.

The frame 12 is a housing member that houses the respective constituent members of the image sensor unit 10. The frame 12 is a substantially rectangular solid that takes the main-scan direction as the longitudinal direction, and is formed to be able to position and support the constituent members inside. As shown in FIG. 1, a light condenser housing portion 13 that houses the light condenser 62 is formed along the main-scan direction at substantially the center of the frame 12. Light guide housing portions 14 that house the light guide unit 20 on both sides between which the light condenser housing portion 13 is placed are formed in the frame 12 in the main-scan direction. On a lower surface of the frame 12, a substrate housing portion 15 for disposing the sensor substrate 64 is formed in a concave shape from the outside of the frame 12 along the main-scan direction. Note that the frame 12 is formed by a light-blocking resin material that, for example, is colored in black. For example, polycarbonate and the like can be applied as the resin material.

The light guide unit 20 guides light from the light source unit 50 that enters from one side in the main-scan direction and the other side in the main-scan direction to the bill S. In the light guide unit 20 of the present embodiment, two light guide portions 21A and 21B are arranged in parallel.

The light guide portions 21A and 21B have identical configurations that are line symmetric about an optical axis Z of the light condenser 62 shown in FIG. 1. The light guide portion 21A will be described here.

As shown in FIG. 3, the light guide portion 21A has a light guide 22 and a reflection member 32.

First, the light guide 22 will be described.

The light guide 22 emits light from the light source unit 50 to the bill S. The light guide 22 is formed of, for example, an acrylic transparent resin material, and is formed in a rod shape that takes the main-scan direction as the longitudinal direction.

Figure 4:
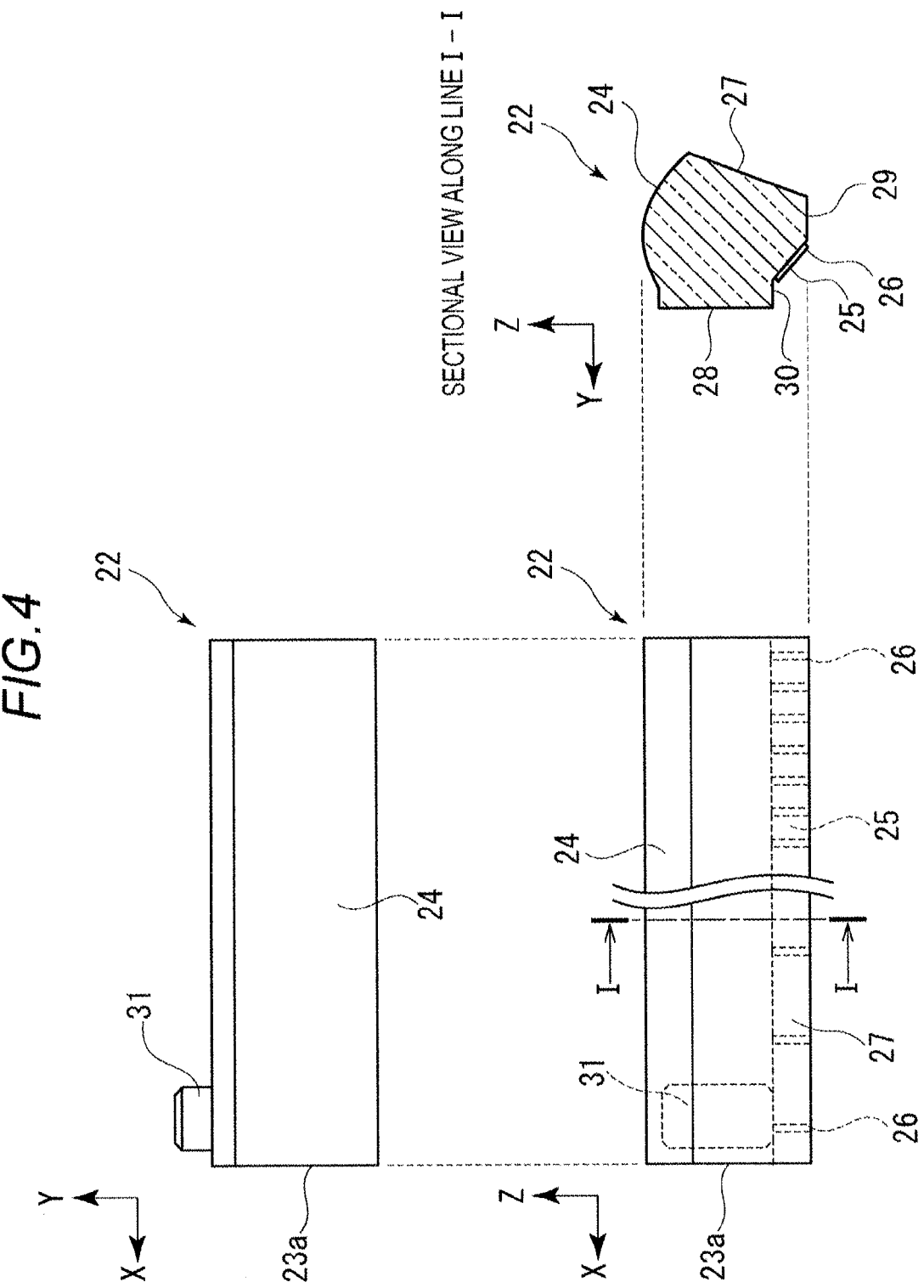
FIG. 4 is a view illustrating the configuration of a light guide.

FIG. 4 illustrates a plan view, a side view and a sectional view along a line I-I of the light guide 22.

In the light guide 22, an incident surface 23a (first incident surface) which enters light from a light source 52, described later, is formed at an end on one side among the two ends in the main-scan direction. The incident surface 23a is orthogonal to the main-scan direction. Further, an emission surface 24 that linearly emits light that entered into the light guide 22 towards the bill S is formed on a surface facing the bill S in the light guide 22. The emission surface 24 is formed in an upwardly convex arc shape. Further, in the light guide 22, on a surface facing the emission surface 24, a diffusing surface 25 is formed that diffuses light which has entered from the incident surface 23a and propagates the light in the longitudinal direction of the light guide 22. On the diffusing surface 25, a plurality of prism-like diffusing portions 26 are formed at intervals in the longitudinal direction. The diffusing portions 26 diffuse light that has been propagated in the longitudinal direction through the light guide 22. The diffused light is reflected by a reflection surface 36, described later, of the reflection member 32 to thereby emit the diffused light towards the bill S from the emission surface 24 of the light guide 22.

In addition, surfaces other than the emission surface 24 and the diffusing surface 25 function as light guiding surfaces that each reflect light that entered the light guide 22 to thereby guide the light in the longitudinal direction of the light guide 22. That is, in the light guide 22 are formed: a light guiding surface 27 that is adjacent to one side of the emission surface 24; a light guiding surface 28 that is adjacent to the other side of the emission surface 24; a light guiding surface 29 that is positioned between the diffusing surface 25 and the light guiding surface 27; and a light guiding surface that is positioned between the diffusing surface and the light guiding surface 28. The light guiding surface 29 and the light guiding surface 30 are parallel to each other, and are orthogonal to the light guiding surface 28. Further, the diffusing surface 25 is not parallel with respect to any surface among the light guiding surface 27 to light guiding surface 30, and is inclined with respect to these surfaces.

A locking projection 31 is integrally formed as a locking portion at an end on one side in the main-scan direction of the light guide 22. The locking projection 31 protrudes in a direction that is orthogonal to the longitudinal direction of the light guide 22 from the light guiding surface 28, specifically, the sub-scan direction. The locking projection 31 is formed in a substantially rectangular shape as seen from the protruding direction.

Next, the reflection member 32 will be described.

The reflection member 32 reflects light that has been diffused by the diffusing portions 26 of the light guide 22, toward the light guide 22. Further, the reflection member 32 holds the light guide 22 in the longitudinal direction. The reflection member 32 is formed, for example, of polycarbonate, and is formed to be slightly longer than the light guide 22 in the main-scan direction. A color that can easily reflect light, for example, white, is applied with respect to the reflection member 32 to improve the reflectance of light.

Figure 5:
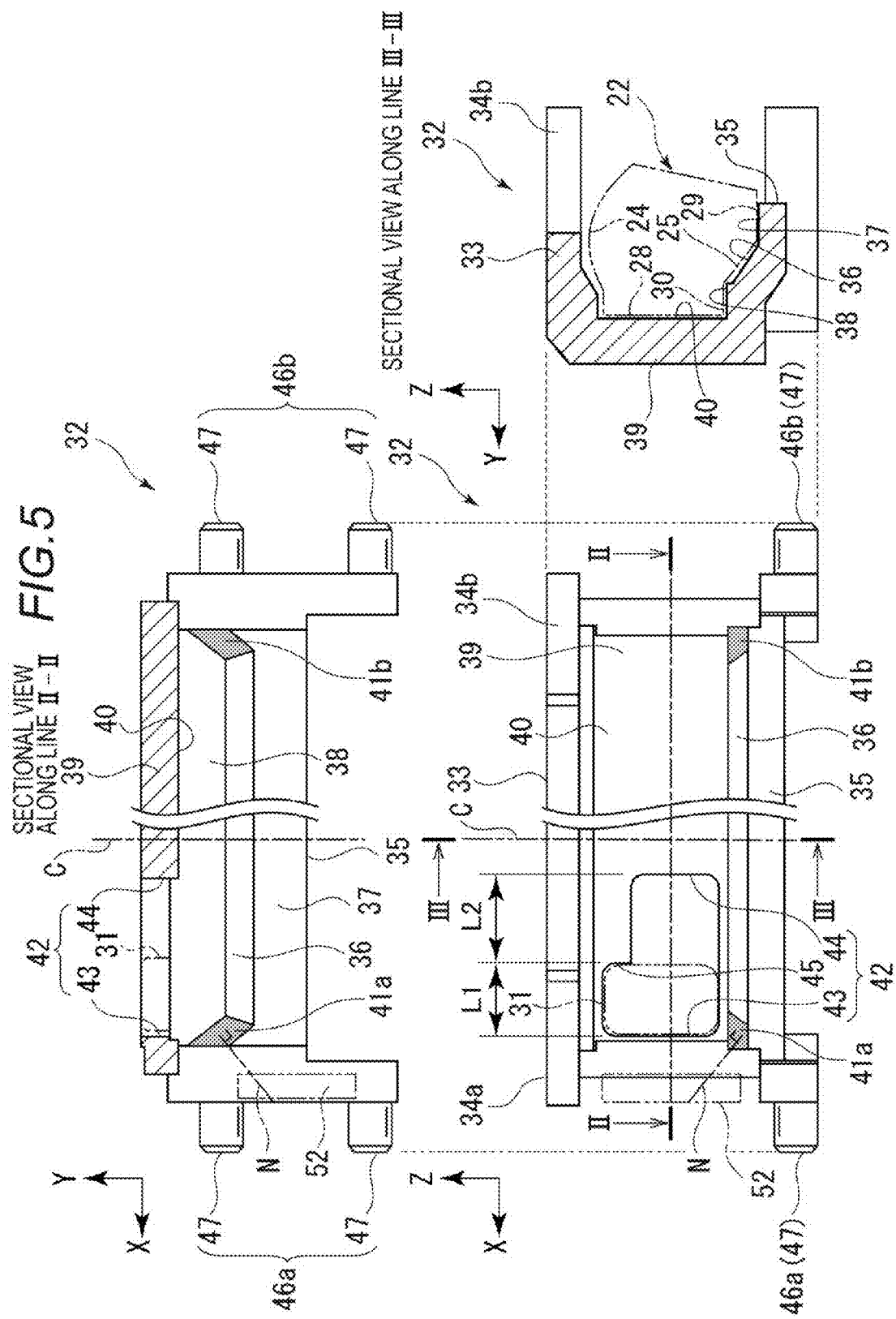
FIG. 5 is a view illustrating the configuration of a reflection member.

FIG. 5 illustrates a side view, a sectional view along a line II-II and a sectional view along a line the reflection member 32. In the sectional view along the line the light guide 22 that is held by the reflection member 32 is indicated by an alternate long and two short dashes line.

The reflection member 32 has, throughout the main-scan direction, a light blocking portion 33, a reflection portion 35 and a side wall part 39, and is formed is an approximately "C" shape that opens to a side on which the light condenser 62 is disposed when viewed in the main-scan direction. The light blocking portion 33 covers a part of the emission surface 24 of the light guide 22 from the upper side. Accordingly, the light blocking portion 33 restricts the direction of light that is emitted towards the bill S from the emission surface 24 of the light guide 22. The light blocking portion 33 has a canopy portion 34a at one end and has a canopy portion 34b at the other end in the main-scan direction. The canopy portions 34a and 34b protrude in the main-scan direction and cover the entire emission surface 24 of the light guide 22 from the upper side. The canopy portion 34a directly blocks light that is emitted to the bill S from the light source 52, described later, without allowing the light to enter the light guide 22. Note that, the canopy portion 34b at the other end of the light blocking portion 33 may be omitted.

The inner surfaces of the reflection portion 35 and the side wall part 39 function as reflection surfaces that reflect light that entered the light guide 22 to the emission surface 24 side of the light guide 22. Specifically, in the reflection portion 35, the reflection surface 36 is formed at a position facing the diffusing surface 25 of the light guide 22. The reflection surface 36 causes light that was diffused by the diffusing portions 26 of the diffusing surface 25 to re-enter the light guide 22 from the diffusing surface 25. Further, in the reflection portion 35, reflection surfaces 37 and 38 are formed at positions facing the light guiding surfaces 29 and 30 of the light guide 22. Furthermore, in the side wall part 39, a reflection surface 40 is formed at a position facing the light guiding surface 28 of the light guide 22. The reflection surface 37 and reflection surface 38 are parallel to each other, and are perpendicular to the reflection surface 40. Further, the reflection surface 36 is not parallel with any surface among the reflection surfaces 37, 38 and 40, and is inclined with respect to these surfaces.

The reflection portion 35 also has an inclined surface 41a (first inclined surface) on one side in the main-scan direction and has an inclined surface 41b (second inclined surface) on the other side. The inclined surfaces 41a and 41b are formed at the same height as the reflection surface 36 and are contiguous to the reflection surfaces 36, 37 and 38. Further, the inclined surfaces 41a and 41b are not parallel with any surface among the reflection surfaces 37, 38 and 40, and are inclined with respect to these surfaces.

Specifically, the inclined surface 41a inclines so as to approach the side wall part 39 toward one end in the main-scan direction. In this case, in FIG. 5, the light source 52 that is attached to the reflection member 32 is indicated by an alternate long and two short dashes line. As seen in the sectional view along the line II-II, the inclined surface 41a inclines so as to move away from the light source 52 towards the one side from the other side in the main-scan direction. Further, a straight line N which is perpendicular to the inclined surface 41a and is illustrated by an alternate long and two short dashes line inclines in each of the main-scan direction, the sub-scan direction and the vertical direction. Specifically, the straight line N is oriented towards the light source 52, and intersects with the light source 52. Further, a color that easily absorbs light, for example, black, is applied with respect to the inclined surface 41a. Note that the inclined surface 41b is symmetric with the inclined surface 41a about a center line C. However, the inclined surface 41b may be omitted.

The side wall part 39 has a locking hole 42 for locking the locking projection 31 of the light guide 22. The locking hole 42 is formed as an opening in the sub-scan direction, specifically, as a hole that penetrates through the side wall part 39, at a position that is close to one end in the main-scan direction of the side wall part 39. The locking hole is formed in a shape such that one portion thereof is larger than the shape of the locking projection 31. In FIG. 5, the locking projection 31 that is inserted into the locking hole 42 is shown by an alternate long and two short dashes line. One side in the main-scan direction of the locking hole 42 is a fitting part 43 in which the locking projection 31 fits, and the other side in the main-scan direction is a light transmitting portion 44 that does not come in contact with the locking projection 31. The light transmitting portion 44 is a cut-out portion that is formed by cutting out a portion of the locking hole 42. The fitting part 43 and the light transmitting portion 44 communicate in the main-scan direction.

The light transmitting portion 44 transmits light that entered the light guide 22 from the light source and does not reflect the light, and emits the light to outside of the side wall part 39. The light transmitting portion 44 is offset in the downward direction relative to the fitting part 43. Accordingly, a step portion 45 is formed on the upper side at the boundary between the fitting part 43 and the light transmitting portion 44. That is, the step portion 45 is formed at the upper side of the locking hole 42. The step portion 45 is positioned further to the upper side than the center in the vertical direction of the fitting part 43. By coming in contact with the step portion 45, the locking projection 31 of the light guide 22 is positioned so as not to move to the other side in the main-scan direction. In contrast, the lower side at the boundary between the fitting part 43 and the light transmitting portion 44 continues rectilinearly in the main-scan direction. Further, the width in the vertical direction of the fitting part 43 is formed to be larger than the width in the vertical direction of the light transmitting portion 44.

In this case, the relation between a length L1 in the main-scan direction of the fitting part 43 and a length L2 in the main-scan direction of the light transmitting portion 44 is that the length L2 of the light transmitting portion 44 is greater than or equal to the length L1 of the fitting part 43. However, the present invention is not limited to the aforementioned relation between the length L1 and the length L2 as long as the light transmitting portion can transmit light that entered the light guide 22 from the light source 52.

The reflection member 32 also has an alignment portion 46a at a lower part at one end in the main-scan direction and an alignment portion 46b at a lower part at the other end in the main-scan direction. Specifically, the alignment portions 46a and 46b are integrally formed at both ends of the reflection portion 35. The light guide 22 and the light source 52 are positioned via the reflection member 32 by coupling the alignment portion 46a with a portion for alignment 59 of a light source substrate 55 that is described later. The alignment portions 46a and 46b each consist of a plurality of (two) cylindrical protrusions 47. The protrusions 47 protrude in parallel along the main-scan direction. Note that the alignment portion 46b may be omitted.

When the light source unit 50 emits light, the light is emitted to the bill S through the light guide unit 20. The light source unit 50 has a light source portion 51A that is disposed at the end of the light guide portion 21A (one side in the main-scan direction), and a light source portion 51B that is disposed at the end of the light guide portion 21B (other side in the main-scan direction).

The light source portions 51A and 51B have the same configuration. Here, the light source portion 51A will be described.

Figure 6:
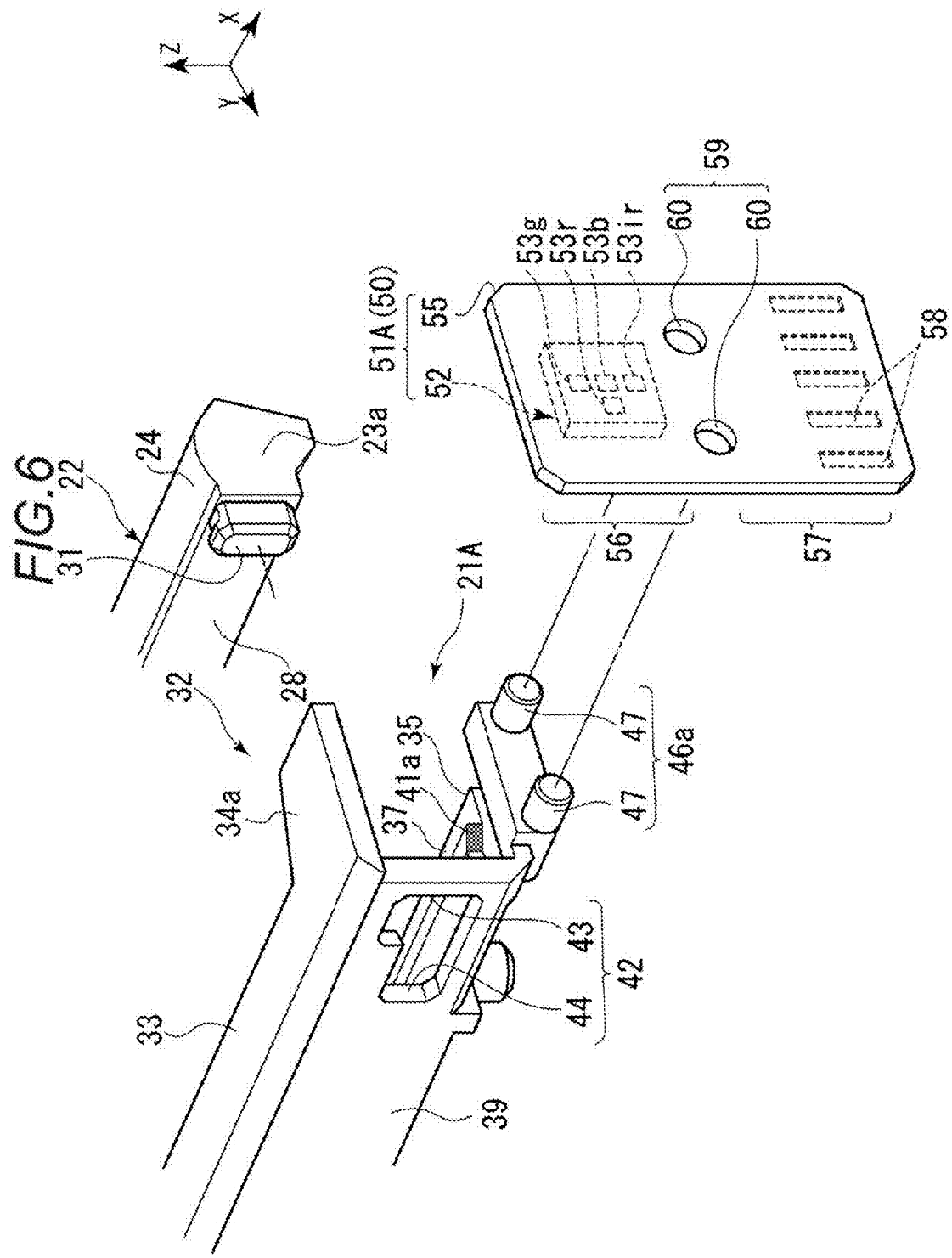
FIG. 6 is a perspective view illustrating the configuration of a light guide portion and a light source portion.

FIG. 6 and FIG. 7 are perspective views that illustrate the configuration of the light guide portion 21A and the light source portion 51A.

The light source portion 51A has a light source (first light source) that is mounted to a mounting surface of the light source substrate 55. A so-called "top-view type surface-mount LED package" in which LED chips as light emitting elements are mounted on the front surface thereof can be applied as the light source 52. In the light source 52 of the present embodiment, a plurality of (for example, four) LED chips 53r, 53g, 53b and 53ir are disposed in a state in which the LED chips are sealed by a transparent resin. As visible light, the LED chips 53r, 53g and 53b emit light of the red, green and blue wavelengths, respectively. Furthermore, the LED chip 53ir emits light of the infrared wavelength. Note that the reason for making an LED chip emit light of an emission wavelength of invisible light, such as infrared light, is to read an image of the bill S that was printed using invisible ink. The light source 52 is mounted on the light source substrate 55 so that each of the LED chips 53r, 53g, 53b and 53ir mainly emit light in the main-scan direction.

The light source substrate 55 is formed in a plate shape. The upper side of the light source substrate 55 is a mounting portion 56 at which the light source 52 is mounted, and the lower side thereof is a connection portion 57 that is connected to a connection hole 66, described later, of the sensor substrate 64. The light source 52 is mounted in advance at a predetermined position on the mounting portion 56 by soldering or the like. A plurality of (for example, five) external connection pads 58 for electrically connecting to the sensor substrate 64 are formed at intervals in the sub-scan direction in the connection portion 57. Note that an unshown circuit pattern is formed in the connection portion 57, and electrically connects the light source 52 and the external connection pads 58. The portion for alignment 59 is also formed in the connection portion 57. The portion for alignment 59 consists of insertion holes 60 for inserting the protrusions 47 of the alignment portion 46a of the reflection member 32.

The light condenser 62 is an optical member that forms an image of light reflected by the bill S on the image sensor 68. The light condenser 62 can be, for example, a rod-lens array including a plurality of image elements (rod lenses) of an erect equal magnification imaging type that are linearly arranged in the main-scan direction. The configuration of the light condenser 62 is not limited to this as long as an image can be formed on the image sensor 68. An optical member with various well-known light condensing functions, such as various micro-lens arrays, can be applied as the light condenser 62.

The sensor substrate 64 is formed in a plate shape that is long in the main-scan direction. The mounting surface 65 of the sensor substrate 64 is orthogonal to the vertical direction. The mounting surface 65 of the sensor substrate 64 is used to mount the image sensor 68 and to mount a driving circuit or the like for making the light source 52 emit light and for driving the image sensor 68. A connection hole 66 as a connection portion into which the light source substrate 55 is inserted is formed at an end on one side and an end on the other side in the main-scan direction of the sensor substrate 64.

The image sensor 68 is mounted on the sensor substrate 64, and disposed below the light condenser 62. The image sensor 68 includes a predetermined number of image sensor ICs 69 that are formed by a plurality of photoelectric conversion elements corresponding to the resolution of reading by the image sensor unit 10 and that are linearly arranged in the main-scan direction and mounted on the mounting surface 65. The image sensor 68 receives light that is reflected by the bill S and formed into an image by the light condenser 62, and converts the light to an electric signal. The configuration of the image sensor 68 is not limited to this as long as the light from the bill S can be converted to an electric signal. Various well-known image sensor ICs can be applied as the image sensor ICs 69.

Next, a method of assembling the image sensor unit 10 configured as described above will be described.

First, the constituent members that constitute the image sensor unit 10 are prepared. At this time, the light source 52 is mounted in advance at a predetermined position on the light source substrate 55, and the image sensor 68 and a driving circuit and the like are mounted at predetermined positions on the sensor substrate 64.

Next, the locking projection 31 of the light guide 22 is inserted into the locking hole 42 of the reflection member 32 from the sub-scan direction so that the light guide 22 is held by the reflection member 32 to thereby form the light guide portion 21A and the light guide portion 21B. At this time, because the locking projection 31 is fitted into the fitting part 43 of the locking hole 42, the light guide 22 is prevented from moving in the main-scan direction inside the reflection member 32. In a case where the light guide 22 expands or contracts in the longitudinal direction depending on the environmental temperature, of the two sides in the longitudinal direction of the light guide 22, the incident surface 23a that is the side that is locked in the locking hole 42 is a fixed end, and the end surface on the opposite side thereto is a free end.

Next, the protrusions 47 of the respective reflection members 32 of the light guide portions 21A and 21B are inserted into the insertion holes 60 of the respective light source substrates 55 of the light source portions 51A and 51B. In a state in which the mounting surface of the light source substrate 55 is abutted against the canopy portion 34a of the reflection member 32, the light guide portions 21A and 21B and the light source substrate are coupled in an aligned state by subjecting the tips of the protrusions 47 that protrude from the insertion holes 60 to thermal caulking. In the state in which the light guide portions 21A and 21B and the light source substrate 55 are coupled, the light source 52 accurately faces the incident surface 23a of the light guide 22 in a state in which there is a gap of a fixed distance therebetween. Accordingly, light from the light source 52 is incident on the incident surface 23a of the light guide 22. At this time, at least one portion of the inclined surface 41a of the reflection member 32 is positioned in the region between the light source 52 and the light guide 22.

Next, the light guide portion 21A and the light guide portion 21B are housed in the light guide housing portions 14, and the light condenser 62 is housed in the light condenser housing portion 13 and fixed using an adhesive or the like. Thereafter, the cover member 11 is laid over the frame 12 from above, and fixed using double-sided tape or the like. Subsequently, the sensor substrate 64 is housed in the substrate housing portion 15 from below. At this time, the connection portion 57 of the light source substrate 55 is inserted into the connection hole 66 of the sensor substrate, and the external connection pads 58 that protrude from the connection hole 66 and the sensor substrate 64 are connected by soldering or the like. Further, the sensor substrate 64 is fixed by adhesive or thermal caulking to the frame 12.

By assembling in this way, each constituent member of the image sensor unit 10 is positioned and supported at a predetermined position inside the frame 12.

Next, basic operation of the image reading apparatus 100 having the image sensor unit 10 configured as described above will be described. The image reading apparatus 100 conveys the bill S in the conveyance direction F at a predetermined conveyance speed by means of the conveyor rollers 101A and 101B and conveyor rollers 102A and 102B. The image sensor unit 10 successively makes each of the LED chips 53r, 53g, 53b and 53ir of the light source 52 emit light. The light emitted from the light source 52 enters the respective light guides 22 from the incident surface 23a of each of the light guides 22. The incident light is emitted from the emission surface 24 of the respective light guides 22 of the light guide portions 21A and 21B as representatively shown by an arrow E in FIG. 1 toward a reading position O for the bill S. The emitted light is linearly emitted in the main-scan direction to one surface (lower surface) of the bill S from the two directions on the opposite sides of the light condenser 62.

The light emitted from the light guide 22 is reflected by the bill S, and the reflected light is imaged on the image sensor 68 through the light condenser 62. The reflected light that is imaged on the image sensor 68 is converted to an electric signal by the image sensor 68, and is thereafter processed by an unshown signal processing portion.

By reading all the light of one scan line that is reflected by the bill S in this way, the image reading apparatus 100 completes the reading operation for one scan line in the main-scan direction of the bill S. After the reading operation for one scan line is completed, the bill S is moved in the sub-scan line direction, and a reading operation for the next one scan line is performed in the same way as the operation described above. By repeating the reading operation for one scan line while conveying the bill S in the conveyance direction F, the image sensor unit 10 sequentially scans the entire surface of the bill S and reads the image information.

In this case, because the image sensor unit 10 of the present embodiment has a configuration in which a portion of the locking hole 42 of the reflection member 32 is cut out, the light amount on the light source 52 side can be prevented from increasing when the image sensor unit 10 emits light linearly to the object of illumination.

Hereunder, an action of the locking hole 42 of the reflection member 32 will be described using an example and a comparative example. Here, an image sensor unit that uses the reflection member 32 in which the light transmitting portion 44 is formed in the locking hole 42 as described above is taken as the example. On the other hand, an image sensor unit using a reflection member 32 in which only the fitting part 43 is formed, and in which the light transmitting portion 44 is not formed in the locking hole 42 is taken as the comparative example.

Figure 8A:
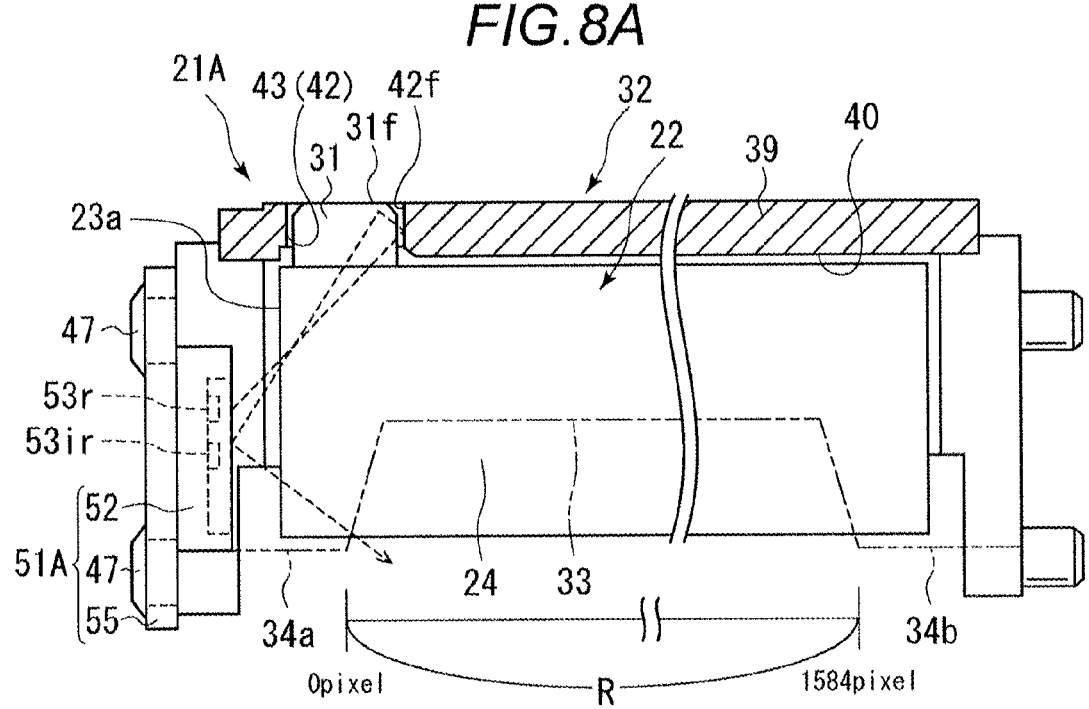
FIG. 8A is a view illustrating an example of a path of light in a comparative example.
Figure 8B:
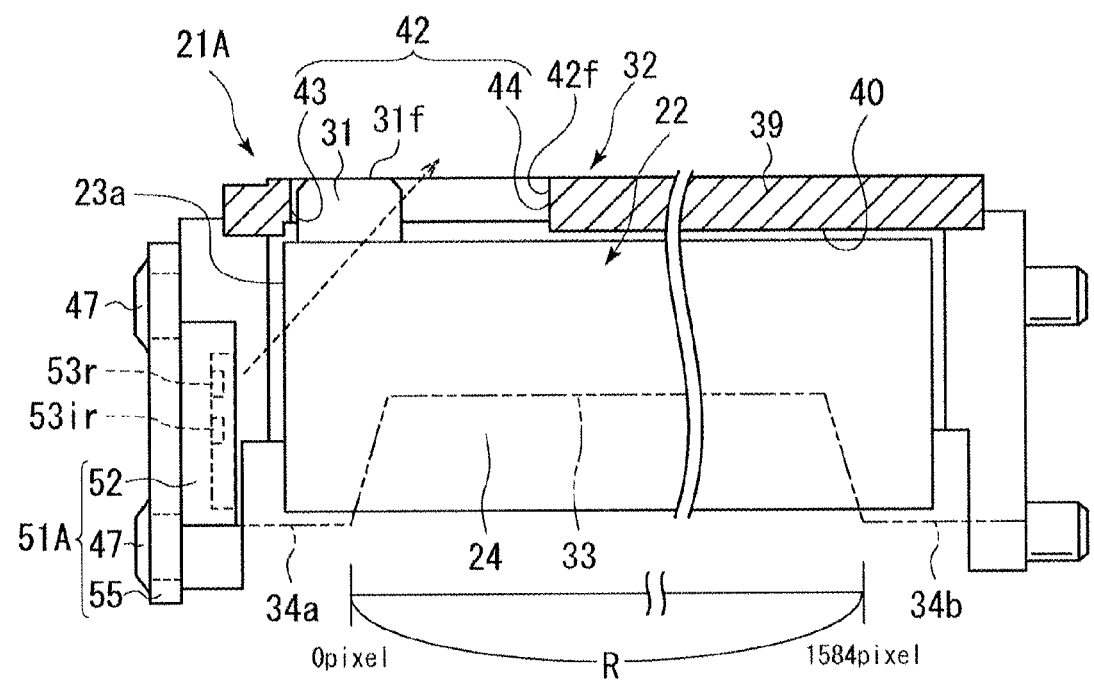
FIG. 8B is a view illustrating an example of a path of light in an example.

FIG. 8A and FIG. 8B are views that illustrate examples of paths of light in the comparative example and the example, respectively. FIG. 8A and FIG. 8B are views of the light source 52 and the light guide portion 21A as seen from the upper direction (bill S side). Note that the reflection member 32 is shown by a sectional view of a section cut along the position of the line II-II in FIG. 4, and the light blocking portion 33 and the canopy portions 34a and 34b are indicted by an alternate long and two short dashes line. In this case, an area between the canopy portion 34a and the canopy portion 34b is taken as a reading range R (0 pixels to 1584 pixels). Note that, since the difference in the comparative example illustrated in FIG. 8A relative to the example illustrated in FIG. 8B is that the light transmitting portion 44 is not formed and only the fitting part 43 is formed, the remaining components are denoted by the same reference numerals as in the example.

In the comparative example illustrated in FIG. 8A, because the light transmitting portion 44 is not formed in the locking hole 42, a face 42f that is on the other side that is perpendicular to the main-scan direction among the inner circumferential faces of the locking hole 42 is positioned close to the light source 52 side. Therefore, light from the light source 52 that is incident on the incident surface 23a of the light guide 22 and propagated through the inside of the locking projection 31 and emitted is reflected by the face 42f. Thereafter, the light is reflected by a face 31f on the tip side of the locking projection 31 and returns to the light source 52. The light that returned to the light source 52 is reflected by the light source 52 and is emitted from the emission surface 24 that is not covered by the canopy portion 34a. Therefore, the light emitted from the emission surface 24 proceeds towards the bill S without being blocked by the canopy portion 34a. As a result, in the comparative example, among the entire reading region R, a greater amount of light is emitted on the light source 52 side.

In contrast, in the example illustrated in FIG. 8B, because the light transmitting portion 44 is formed in the locking hole 42, the face 42f on the other side that is perpendicular to the main-scan direction among the inner circumferential faces of the locking hole 42 is positioned away from the light source 52. Therefore, light from the light source 52 that is incident on the incident surface 23a of the light guide 22 and emitted from the locking projection 31 passes through the light transmitting portion 44 without arriving as far as the face 42f and is emitted to outside of the reflection member 32. The light emitted to outside of the reflection member is absorbed by the frame 12. Therefore, in the example, the occurrence of a situation in which a greater amount of light is emitted on the light source 52 side can be prevented.

Figure 9A:
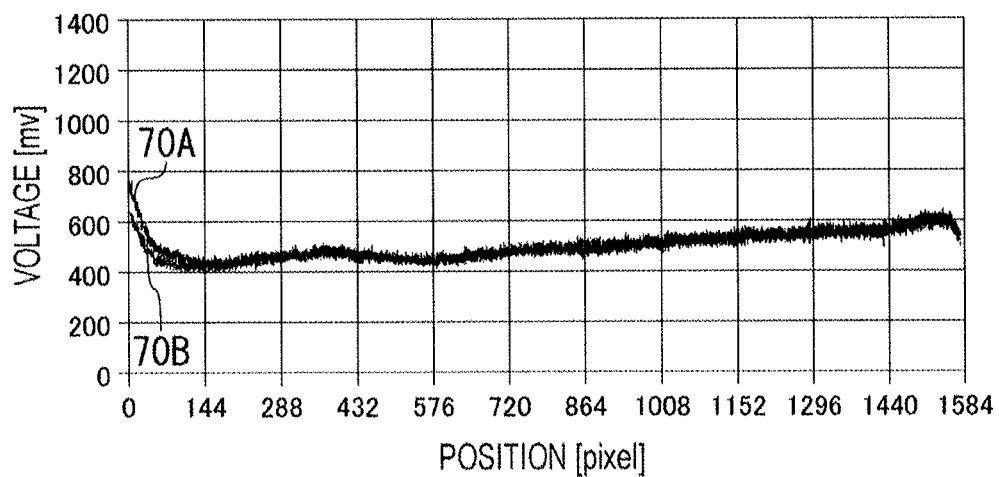
FIG. 9A is a graph illustrating voltages that are output in the comparative example and the example.
Figure 9B:
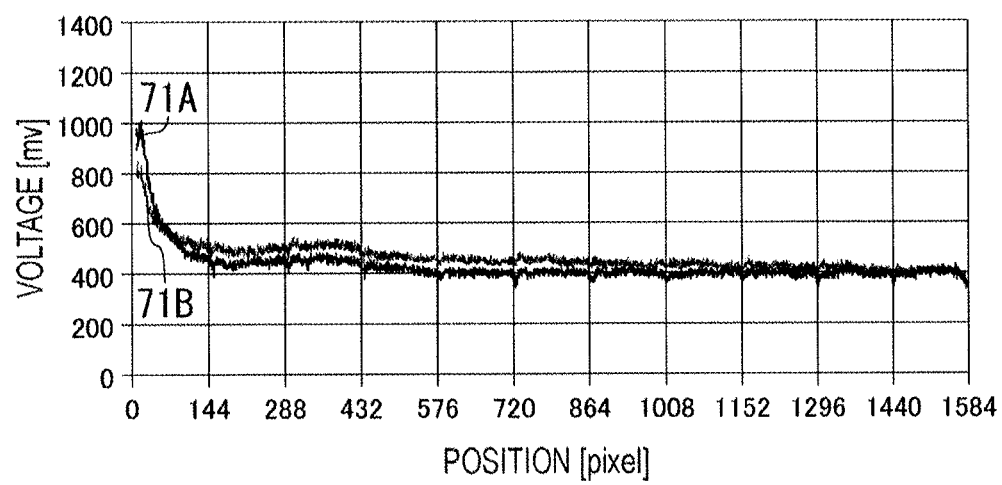
FIG. 9B is a graph illustrating voltages that are output in the comparative example and the example.

FIG. 9A and FIG. 9B are graphs that simulate voltages that are output when, with respect to a case in which the reflection member 32 of the example is used and a case in which the reflection member 32 of the comparative example is used, light is emitted at the same object of illumination, and light reflected by the object of illumination is received by the image sensor 68. The vertical axis denotes a voltage value [mV], and the horizontal axis denotes a position [pixel] in the reading range. FIG. 9A shows a case where only the LED chip 53r of the light source 52 of the light guide portion 21A was caused to emit light, in which reference character 70A denotes the comparative example and reference character 70B denotes the example. On the other hand, FIG. 9B shows a case where only the LED chip 53*ir* of the light source 52 of the light guide portion 21A was caused to emit light, in which reference character 71A denotes the comparative example and reference character 71B denotes the example.

As shown in FIG. 9A and FIG. 9B, in the comparative example, the output projects significantly at a position close to a 0 [pixel] of the reading range, that is, on the light source 52 side. That is, in the comparative example, it is shown that the amount of emitted light is greater on the light source side. On the other hand, in the example, the output that projects in the comparative example decreases. That is, in the example, it is shown that the amount of emitted light can be prevented from increasing on the light source side.

Thus, according to the present embodiment, because the light transmitting portion (cut-out portion) 44 at which a portion has been cut out is formed in the locking hole 42 of the reflection member 32, light that is propagated through the locking projection 31 of the light guide 22 passes through the light transmitting portion 44 without being reflected by the reflection member 32, and is emitted to outside the reflection member 32. Therefore, an increase in the light amount on the light source 52 side can be prevented.

Further, according to the present embodiment, the fitting part 43 in which the locking projection 31 fits is formed in the locking hole 42, and the light transmitting portion 44 is formed on the other side in the main-scan direction relative to the fitting part 43. Therefore, because the light emitted from the locking projection 31 of the light guide 22 is transmitted by the light transmitting portion 44, the light can be emitted to outside of the reflection member 32 without being reflected by the reflection member 32.

Further, according to the present embodiment, because the step portion 45 that the locking projection 31 comes in contact with is provided at the boundary between the fitting part 43 and the light transmitting portion 44, the light guide 22 can be positioned so that the light guide 22 does not move to the other side in the main-scan direction.

In addition, according to the present embodiment, because the step portion 45 is formed at the upper side of the locking hole 42, even if light is reflected by the step portion 45, the light can be blocked by the light blocking portion 33 of the reflection member 32 that is disposed adjacent to the step portion 45.

Further, according to the present embodiment, because the length L2 in the main-scan direction of the light transmitting portion 44 is equal to or greater than the length L1 in the main-scan direction of the fitting part 43, most of the light that is emitted from the locking projection 31 of the light guide 22 can be transmitted by the light transmitting portion 44.

(Second Embodiment)

Although in the first embodiment a case was described in which the step portion 45 is formed at the upper side of the locking hole 42 of the reflection member 32, in the present embodiment a case is described in which a step portion 81 is formed on the lower side of the locking hole 42 of a reflection member 80.

FIG. 10 is a perspective view illustrating the configuration around the reflection member 80. Note that components that are the same as in the first embodiment are denoted by the same reference numerals and a description of such components will be omitted as appropriate.

One side in the main-scan direction of the locking hole 42 of the reflection member 80 is the fitting part 43 in which the locking projection 31 fits, and the other side in the main-scan direction is the light transmitting portion 44 that does not come in contact with the locking projection 31.

The step portion 81 is formed at a lower side of a portion that communicates between the fitting part and the light transmitting portion 44 (hereunder, referred to as "communication portion 82"). That is, the step portion 81 is formed on the lower side of the locking hole 42. In the present embodiment, a portion of the locking hole 42 protrudes to form the step portion 81. Therefore, a width in the vertical direction on the other side in the main-scan direction of the light transmitting portion 44 is the same as a width in the vertical direction of the fitting part 43. That is, a width in the vertical direction of the communication portion 82 is less than a width in the vertical direction of the fitting part 43 and is also less than a width in the vertical direction of the light transmitting portion 44.

Further, the relation between a length L1 in the main-scan direction of the fitting part 43 and a length L2 (length that includes the step portion 81) in the main-scan direction of the light transmitting portion 44 is that the length L2 of the light transmitting portion 44 is equal to or greater than the length L1 of the fitting part 43. However, the present invention is not limited to the aforementioned relation between the length L1 and the length L2 as long as the light transmitting portion can transmit light that enters the light guide 22 from the light source 52.

Thus, according to the present embodiment, by having the step portion 81 which the locking projection 31 comes in contact with at the boundary between the fitting part 43 and the light transmitting portion 44, the light guide 22 can be positioned so as not to move to the other side in the main-scan direction.

(Third Embodiment)

Next, a configuration in which the above described image sensor unit 10 is applied to a flatbed-type scanner 110 as an image reading apparatus will be described referring to FIG. 11.

Figure 11:
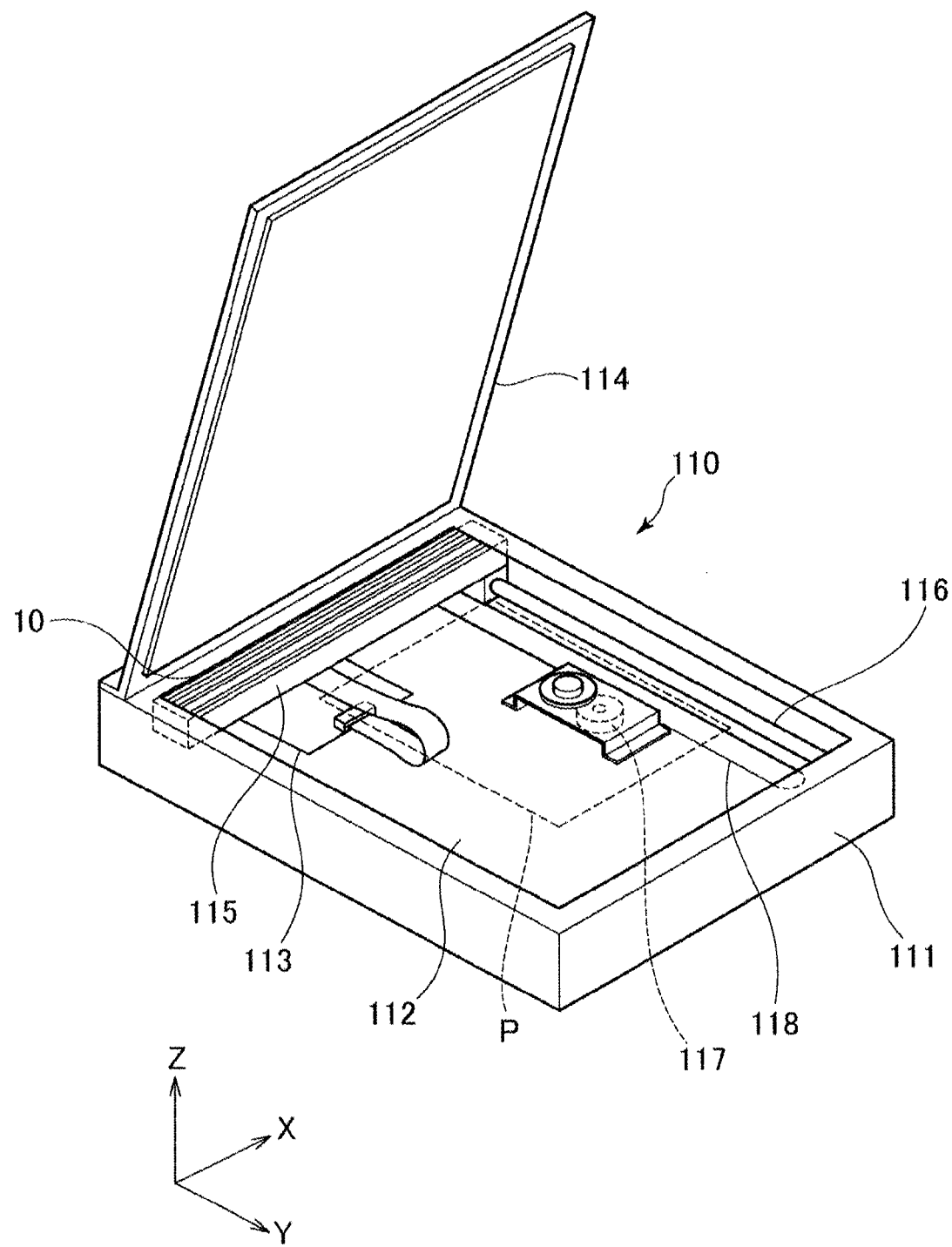
FIG. 11 is a perspective view illustrating an example of the configuration of a flatbed-type scanner.

FIG. 11 is a perspective view illustrating an example of the configuration of the flatbed-type scanner 110.

The scanner 110 includes a housing 111, a platen glass 112 as an object of illumination placing part, the image sensor unit 10, a driving mechanism that drives the image sensor unit 10, a circuit board 113, and a platen cover 114. The platen glass 112 is composed of a transparent plate such as a glass plate, and is mounted to the upper face of the housing 111. The platen cover 114 is attached in a manner allowing opening and closing thereof to the housing 111 through a hinge mechanism or the like so as to cover an object of illumination P that has been placed on the platen glass 112. The image sensor unit 10, the driving mechanism for driving the image sensor unit. 10, and the circuit board 113 are housed inside the housing 111. Note that, since the scanner 110 has the platen glass 112, the image sensor unit 10 need not have the cover member 11.

The driving mechanism includes a holding member 115, a guide shaft 116, a drive motor 117 and a wire 118. The holding member 115 surrounds and holds the image sensor unit 10. The guide shaft 116 movably guides the holding member 115 in the reading direction (sub-scan direction) along the platen glass 112. The drive motor 117 and the holding member 115 are coupled through the wire 118, and the holding member 115 that holds the image sensor unit 10 is driven in the sub-scan direction by a driving force of the drive motor 117. The image sensor unit 10 reads an original or the like as the object of illumination P that was placed on the platen glass 112, while moving in the sub-scan direction under the driving force of the drive motor 117. Thus, the object of illumination P is read while relatively moving the image sensor unit 10 and the object of illumination P.

An image processing circuit that performs predetermined image processing on an image that was read by the image sensor unit 10, a control circuit that controls each portion of the scanner 110 including the image sensor unit 10, and a power supply circuit that supplies power to each portion of the scanner 110 and the like are constructed on the circuit board 113.

(Fourth Embodiment)

Next, a configuration in which the above described image sensor unit 10 is applied to a sheet-feed type scanner 120 as an image reading apparatus will be described referring to FIG. 12.

Figure 12:
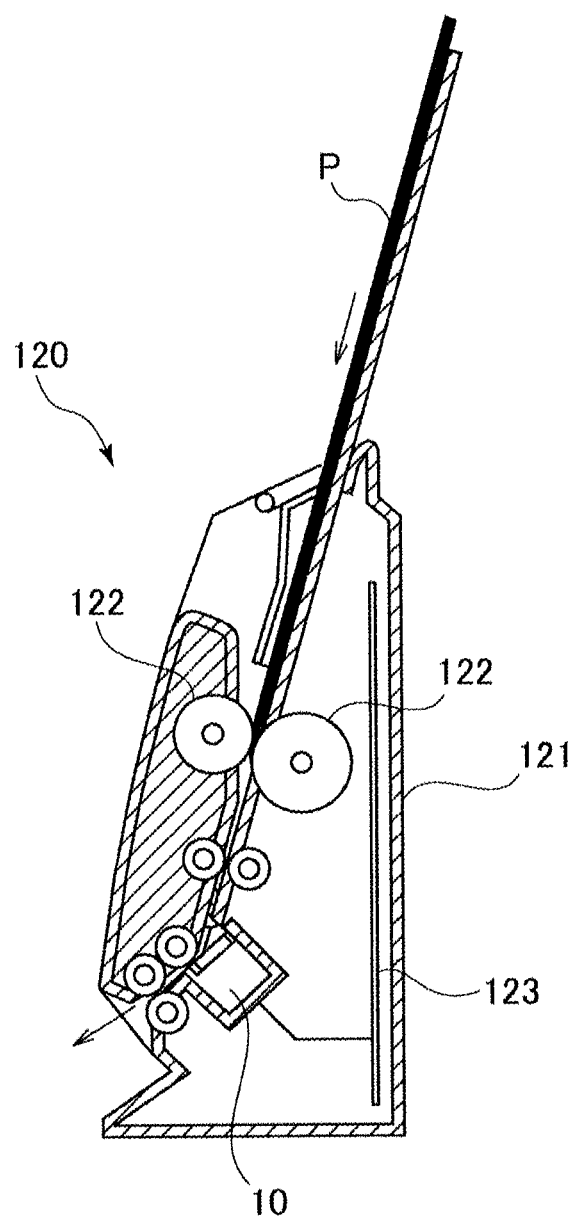
FIG. 12 is a sectional view illustrating an example of the configuration of a sheet-feed type scanner.

FIG. 12 is a sectional view illustrating an example of the configuration of the sheet-feed type scanner 120.

The scanner 120 includes a housing 121, the image sensor unit 10, conveyor rollers 122 and a circuit board 123. A driving mechanism that is not illustrated in the drawings causes the conveyor rollers 122 to rotate so as to sandwich the object of illumination P therebetween and convey the object of illumination P. A control circuit that controls each portion of the scanner 120 including the image sensor unit 10, and a power supply circuit that supplies power to each portion of the scanner 120 and the like are constructed on the circuit board 123.

The scanner 120 reads the object of illumination P by means of the image sensor unit 10 while conveying the object of illumination P in the reading direction (sub-scan direction) by means of the conveyor rollers 122. That is, the scanner 120 reads the object of illumination P while relatively moving the image sensor unit 10 and the object of illumination P. Note that although an example of the scanner 120 that reads one side of the object of illumination P is illustrated in FIG. 12, a configuration may also be adopted in which two image sensor units 10 are provided so as to face each other across the conveyance path of the object of illumination P, and which thereby reads both sides of the object of illumination P.

(Fifth Embodiment)

Next, a configuration in which the above described image sensor unit 10 is applied to an image forming apparatus 130 will be described referring to FIG. 13 and FIG. 14.

Figure 13:
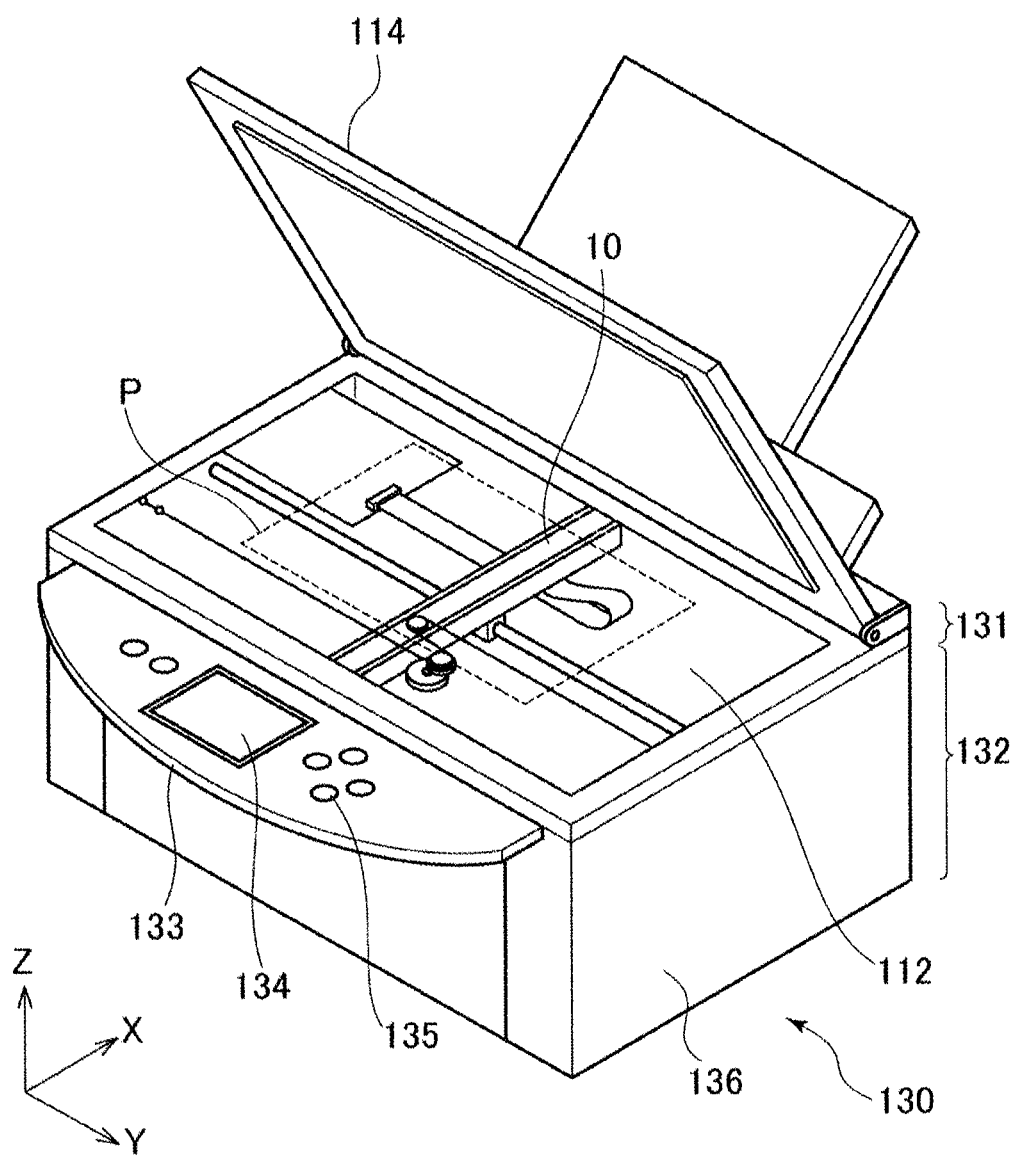
FIG. 13 is a perspective view illustrating the external appearance of an image forming apparatus.

FIG. 13 is a perspective view that illustrates the external appearance of the image forming apparatus 130. FIG. 14 is a perspective view in which an image forming portion 132 that is provided in a housing of the image forming apparatus 130 is illustrated in a state in which the image forming portion 132 is extracted from the housing of the image forming apparatus 130.

The image forming apparatus 130 is a compound machine (MFP: multifunction printer) of a flatbed-type scanner and an inkjet printer. The image forming apparatus 130 includes an image reading portion 131 as image reading means that reads an image, and the image forming portion 132 as image forming means that forms an image. The image sensor unit 10 is incorporated into the image reading portion 131 of the image forming apparatus 130. Configurations common to those of the image reading apparatus described above can be applied to the image reading portion 131 of the image forming apparatus 130. Accordingly, a description of the configurations common to those of the image reading apparatus will not be repeated.

As illustrated in FIG. 13, an operation portion 133 is provided in the image forming apparatus 130. The operation portion 133 includes a display portion 134 that displays an operation menu and various messages and the like, and various operation buttons 135 for operating the image forming apparatus 130. Further, as illustrated in FIG. 14, the image forming portion 132 is provided inside a housing 136 of the image forming apparatus 130. The image forming portion 132 includes conveyor rollers 137, a guide shaft 138, an inkjet cartridge 139, a motor 140 and a pair of timing pulleys 141. The conveyor rollers 137 rotate by means of a driving force of a driving source, and convey a printing paper R as a recording medium in the sub-scan direction. The guide shaft 138 is a rod-shaped member, and is fixed to the housing 136 of the image forming apparatus 130 so that the axis thereof is parallel to the main-scan direction of the printing paper R.

The inkjet cartridge 139 can move back and forth in the main-scan direction of the printing paper R by sliding on the guide shaft 138. The inkjet cartridge 139 includes, for example, ink tanks 142 (142C, 142M, 142Y and 142K) that are equipped with cyan C, magenta M, yellow Y and black K ink, and discharge heads 143 (143C, 143M, 143Y and 143K) that are provided in the respective ink tanks 142. One of the pair of timing pulleys 141 is attached to a rotating shaft of the motor 140. The pair of timing pulleys 141 are provided at positions that are separated from each other in the main-scan direction of the printing paper R. A timing belt 144 is wound around the pair of timing pulleys 141 in parallel with the pair of timing pulleys 141, and a predetermined section thereof is coupled to the inkjet cartridge 139.

The image reading portion 131 of the image forming apparatus 130 converts an image read by the image sensor unit 10 to an electric signal in a form that is suitable for printing. The image forming portion 132 of the image forming apparatus 130 drives the conveyor rollers 137, the motor 140 and the inkjet cartridge 139 based on the electric signal converted by the image sensor unit 10 of the image reading portion 131 and forms an image on the printing paper R. In addition, the image forming portion 132 of the image forming apparatus 130 can form an image based on an electric signal input from the outside. The same configurations as those of various well-known printers can be applied to the configurations and operation of the image forming portion 132 in the image forming apparatus 130. Therefore, the details will not be described. Although an inkjet-type image forming apparatus has been described as the image forming portion 132, the type can be any type, such as an electrophotographic type, a thermal transfer type, and a dot impact type.

Although preferred embodiments of the present invention have been described above, the present invention is not limited to these embodiments, and various modifications and alterations can be made without departing from the spirit of the present invention, and the respective embodiments described above may be combined.

In the respective embodiments described above, cases where the image sensor unit 10 is disposed on the lower side relative to the conveyance path of the bill S have been described. However, the present invention is not limited to such cases. As indicated by an alternate long and two short dashes line shown in FIG. 1, the image sensor unit 10 may also be disposed on the upper side relative to the conveyance path of the bill S. Further, the image sensor unit may be disposed on each of the upper and lower sides in a manner that sandwiches the conveyance path therebetween. By disposing the image sensor unit 10 on the upper and lower sides in a manner that sandwiches the conveyance path, it is possible to read both sides of the bill S in one conveyance, and to read light transmitted through the bill S.

In the respective embodiments described above, cases where the light guide unit 20 has the light guide portion 21A and the light guide portion 21B have been described. However, the present invention is not limited to such cases. In a case where the relevant light amount is not required, the light guide unit 20 may be configured to have only the light guide portion 21A or only the light guide portion 21B.

In the respective embodiments described above, cases in which the light source 52 in which the four LED chips 53r, 53g, 53b and 53ir are disposed is used have been described. However, the present invention is not limited to such cases, and a light source may be used in which one to three LED chips or five or more LED chips are disposed. Further, the kinds of LED chips may be added or changed according to the object of illumination. For example, an LED chip 53uv that emits ultraviolet light may be added, or the LED chip 53uv may be used instead of the LED chip 53ir.

Furthermore, in the respective embodiments described above, the light source 52 may be disposed at both ends of the light guide portion 21A and the light source 52 may be disposed at both ends of the light guide portion 21B.

Further, in the respective embodiments described above, cases where the locking projection 31 protrudes in the sub-scan direction have been described. However, the present invention is not limited to such cases, and the locking projection 31 may protrude in a direction which is perpendicular to the main-scan direction and which is inclined to a certain degree with respect to the sub-scan direction.

According to the present invention, a light amount on a light source side can be prevented from increasing when light is linearly emitted to an object of illumination.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. An illumination apparatus comprising:
    a light source that emits light;
    a rod-like light guide having an incident surface that the light from the light source enters and that is disposed on one side in a longitudinal direction, a diffusing surface that diffuses light received from the incident surface, and an emission surface that emits light towards an object of illumination; and
    a reflection member having a reflection surface that reflects light that is diffused by the diffusing surface to the light guide,
    wherein:
    the light guide has a locking projection that is locked in the reflection member on the one side in the longitudinal direction,
    the reflection member has a locking hole in which the locking projection is locked, and
    a cut-out portion at which one part is cut out is formed in the locking hole.

2. The illumination apparatus according to claim 1, wherein:
    a fitting part in which the locking projection fits is formed in the locking hole, and
    the cut-out portion is formed at a position that is further to the other side in the longitudinal direction relative to the fitting part.

3. The illumination apparatus according to claim 2, further comprising:
    a step portion at a portion that communicates between the fitting part and the cut-out portion;
    wherein, in the portion that communicates, a width in a vertical direction which is orthogonal to the longitudinal direction and to an opening direction of the locking hole is less than a width in the vertical direction of the fitting part and is also less than a width in the vertical direction of the cut-out portion.

4. The illumination apparatus according to claim 3, wherein:
    when a direction that is orthogonal to the longitudinal direction and to the opening direction of the locking hole is taken as the vertical direction, and the object of illumination side is taken as an upper side,
    the step portion is formed on either one of an upper side and a lower side of the locking hole.

5. The illumination apparatus according to claim 2, wherein a length in the longitudinal direction of the cut-out portion is equal to or greater than a length in the longitudinal direction of the fitting part.

6. An image sensor unit comprising:
    an illumination apparatus;
    an image sensor that converts light from an object of illumination to an electric signal; and
    a sensor substrate on which the image sensor is mounted, wherein:
    the illumination apparatus comprises:
    a light source that emits light;
    a rod-like light guide having an incident surface that the light from the light source enters and that is disposed on one side in a main-scan direction, a diffusing surface that diffuses light received from the incident surface, and an emission surface that emits light towards an object of illumination; and
    a reflection member having a reflection surface that reflects light that is diffused by the diffusing surface to the light guide,
    the light guide has a locking projection that is locked in the reflection member on the one side in the main-scan direction,
    the reflection member has a locking hole in which the locking projection is locked, and
    a cut-out portion at which one part is cut out is formed in the locking hole.

7. The image sensor unit according to claim 6, wherein:
    a fitting part in which the locking projection fits is formed in the locking hole, and
    the cut-out portion is formed at a position that is further to the other side in the main-scan direction relative to the fitting part.

8. The image sensor unit according to claim 7, further comprising:
    a step portion at a portion that communicates between the fitting part and the cut-out portion;
    wherein, in the portion that communicates, a width in a vertical direction which is orthogonal to the main-scan direction and a sub-scan direction is less than a width in the vertical direction of the fitting part and is also less than a width in the vertical direction of the cut-out portion.

9. The image sensor unit according to claim 8, wherein:
    when a direction that is orthogonal to the main-scan direction and the sub-scan direction is taken as the vertical direction, and the object of illumination side is taken as an upper side,
    the step portion is formed on either one of an upper side and a lower side of the locking hole.

10. The image sensor unit according to claim 7, wherein a length in the main-scan direction of the cut-out portion is equal to or greater than a length in the main-scan direction of the fitting part.

11. An image reading apparatus comprising:
an image sensor unit having an illumination apparatus, an image sensor that converts light from an object of illumination to an electric signal, and a sensor substrate on which the image sensor is mounted; and
a transport portion that relatively transports the image sensor unit and the object of illumination,
wherein:
the illumination apparatus comprises:
a light source that emits light;
a rod-like light guide having an incident surface that the light from the light source enters and that is disposed on one side in a main-scan direction, a diffusing surface that diffuses light received from the incident surface, and an emission surface that emits light towards the object of illumination; and
a reflection member having a reflection surface that reflects light that is diffused by the diffusing surface to the light guide,
the light guide has a locking projection that is locked in the reflection member on the one side in the main-scan direction,
the reflection member has a locking hole in which the locking projection is locked, and
a cut-out portion at which one part is cut out is formed in the locking hole.

12. The image reading apparatus according to claim 11, wherein:
a fitting part in which the locking projection fits is formed in the locking hole, and
the cut-out portion is formed at a position that is further to the other side in the main-scan direction relative to the fitting part.

13. The image reading apparatus according to claim 12, further comprising:
a step portion at a portion that communicates between the fitting part and the cut-out portion;
wherein, in the portion that communicates, a width in a vertical direction which is orthogonal to the main-scan direction and a sub-scan direction is less than a width in the vertical direction of the fitting part and is also less than a width in the vertical direction of the cut-out portion.

14. The image reading apparatus according to claim 13, wherein:
when a direction that is orthogonal to the main-scan direction and the sub-scan direction is taken as the vertical direction, and the object of illumination side is taken as an upper side,
the step portion is formed on either one of an upper side and a lower side of the locking hole.

15. The image reading apparatus according to claim 12, wherein a length in the main-scan direction of the cut-out portion is equal to or greater than a length in the main-scan direction of the fitting part.

16. An illumination apparatus comprising:
a light source that emits light;
a rod-like light guide that guides the light from the light source; and
a light guide cover that covers a part of the light guide, wherein:
the light source is disposed on one end in a longitudinal direction of the light guide,
the light guide has a projection that projects in a direction intersecting with the longitudinal direction,
the light guide cover has a hole corresponding to the projection, and
the hole includes a first portion in which the projection fits and a second portion in communication with the first portion in the longitudinal direction and in which the projection is not disposed.

* * * * *